(12) United States Patent
Preis et al.

(10) Patent No.: US 9,850,951 B2
(45) Date of Patent: Dec. 26, 2017

(54) ELECTRICAL INSULATED BEARING

(71) Applicants: Karl Preis, Traun (AT); Helmut Weninger, Steyr (AT); Xiaobo Zhou, Houten (NL)

(72) Inventors: Karl Preis, Traun (AT); Helmut Weninger, Steyr (AT); Xiaobo Zhou, Houten (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/045,561

(22) Filed: Feb. 17, 2016

(65) Prior Publication Data

US 2016/0238074 A1 Aug. 18, 2016

(30) Foreign Application Priority Data

Feb. 17, 2015 (GB) .................................. 1502633.9

(51) Int. Cl.
*F16C 33/62* (2006.01)
*F16C 33/64* (2006.01)
*F16C 33/58* (2006.01)
*C23C 4/10* (2016.01)
*C23C 4/18* (2006.01)
*H01B 17/56* (2006.01)
*C23C 4/129* (2016.01)
*C23C 4/134* (2016.01)
*C23C 4/11* (2016.01)
*F16C 19/06* (2006.01)

(52) U.S. Cl.
CPC .................. *F16C 33/62* (2013.01); *C23C 4/11* (2016.01); *C23C 4/129* (2016.01); *C23C 4/134* (2016.01); *C23C 4/18* (2013.01); *F16C 33/586* (2013.01); *F16C 33/64* (2013.01); *F16C 19/06* (2013.01); *F16C 2202/30* (2013.01); *F16C 2206/44* (2013.01); *F16C 2208/80* (2013.01); *F16C 2223/42* (2013.01); *F16C 2240/60* (2013.01)

(58) Field of Classification Search
CPC ...... F16C 33/043; F16C 33/62; F16C 33/201; F16C 33/208; F16C 33/583; F16C 2208/90; F16C 2223/02; F16C 2223/42; F16C 2240/60; C23C 4/11; C23C 4/18; C23C 4/129; H01B 3/12
USPC .... 384/276, 492, 569, 625, 907.1, 912–913, 384/902; 427/308, 400, 320, 372.2, 427/385.5, 532, 340; 29/898.066
See application file for complete search history.

(56) References Cited

U.S. PATENT DOCUMENTS

| 3,924,906 A | 12/1975 | Kitaoka |
| 4,320,931 A | 3/1982 | Shaffer |
| 2006/0014303 A1* | 1/2006 | Takazawa ........... H01F 17/0013 438/1 |

(Continued)

FOREIGN PATENT DOCUMENTS

| DE | 19519468 A1 * | 11/1995 |
| EP | 2952737 A1 * | 12/2015 |

(Continued)

*Primary Examiner* — Marcus Charles
(74) *Attorney, Agent, or Firm* — Bryan Peckjian; SKF USA Inc. Patent Dept.

(57) ABSTRACT

A bearing component having a ceramic surface, the ceramic surface including a plurality of pores, and at least some of the pores are at least partially filled with a resin comprising a resole phenolic resin.

19 Claims, 2 Drawing Sheets

(56) References Cited

U.S. PATENT DOCUMENTS

| | | | | |
|---|---|---|---|---|
| 2006/0052233 A1* | 3/2006 | Beeckman | ............ | B01J 20/183 502/60 |
| 2013/0040537 A1* | 2/2013 | Schwabel | ................ | B24D 5/04 451/28 |
| 2015/0380124 A1* | 12/2015 | Martin | ...................... | C23C 4/11 384/492 |

FOREIGN PATENT DOCUMENTS

| | | | |
|---|---|---|---|
| GB | 1591560 A | | 6/1981 |
| JP | 01240676 A | * | 9/1989 |
| JP | H0668331 B2 | * | 8/1994 |
| JP | 10259266 A | * | 9/1998 |
| JP | 11147303 A | * | 6/1999 |
| JP | 2002187788 A | * | 7/2002 |
| JP | 2009210090 A | | 9/2009 |
| KR | 20130014408 A | * | 2/2013 |
| WO | WO 02103780 A1 | * | 12/2002 |
| WO | WO 2010036801 A2 | * | 4/2010 |
| WO | 2014174382 A1 | | 10/2014 |

\* cited by examiner

ELECTRICAL INSULATED BEARING

CROSS-REFERENCE TO RELATED APPLICATIONS

This is a Non-Provisional patent application, filed under the Paris Convention, claiming the benefit of Great Britain (GB) Patent Application Number 1502633.9, filed on 17 Feb. 2015, which is incorporated herein by reference in its entirety.

TECHNICAL FIELD

The present invention relates to the field of bearings. More specifically, the present invention relates to a novel electrical insulating layer for bearing components and to bearings comprising said components.

BACKGROUND OF THE INVENTION

Bearings are devices that permit relative motion between two parts. Rolling element bearings typically comprise inner and outer raceways and a plurality of elements (e.g. rolling elements such as balls or rollers) disposed therebetween. For long-term reliability it is important that the various elements have a high resistance to rolling contact fatigue, wear and creep. For these reasons, bearing steels are the material of choice for most bearing components.

Electric motors, generators and associated equipment are at risk when an electric current passes through a bearing. This can damage the contact surfaces of rolling elements and raceways in the bearing (electrical erosion) and rapidly degrade the grease. An additional risk in electric motors and generators comes from high frequency currents due to the inherent stray capacitance. The risk of damage increases if the application uses a frequency converter.

Electric currents in rotating shafts can be either intentionally established or produced by imbalances in inductive rotating machinery. In either case it is often desirable to insulate the two components from one another through an insulated bearing. The problem of shaft currents in rotating inductive machinery has been recognized for decades as a substantial factor limiting bearing life.

The contact areas between housing, outer ring, rolling elements, inner ring and shaft can act as electric contacts. Current flow through bearings can result in significant degradation of their useful life in a relatively short period of time. For example electric current passage will damage rolling elements and raceways of bearing rings and rapidly degrade the lubricant. Typical damage is characterised by craters and false brinelling.

There are several known approaches to eliminating current flow through bearings. Ceramic rolling elements have been considered for use in bearing applications. There are, however, perceived intrinsic limitations associated with the use of ceramic rolling elements in safety critical applications.

One approach to making a bearing less conductive is to alter the bulk material of bearing component so as to resist flow of electricity. This is limited by the mechanical and cost demands of bearing applications and manufacture. Alternatively, it is possible to coat bearing components with resistive materials, which is more cost effective. However, such coatings must be provided with sufficient hardness.

GB 1591560 discloses a machine supported by bearings disposed in bearing bores, wherein the bearing bores are insulated by a layer of alumina.

U.S. Pat. No. 4,320,931 discloses an insulated bearing wherein said bearing comprises a bearing shell and an inner bearing material (Babbitt). A base layer is applied to the shell (preferably by a plasma spray method), a thicker ceramic insulating material layer is disposed onto the base layer and finally an "adhesion" layer (preferably of a metallic material) is added to serve as a binder between the shell and the final layer of bearing material (Babbitt).

Insulating the housing or shaft is often expensive and time-consuming. U.S. Pat. No. 3,924,906 teaches an alternative method for insulating bearings. It discloses electrically insulated bearings comprising an insulating coating of a light metal oxide or ceramic. The insulating coating is applied to the non-rotating surfaces of the housing or bearings by plasma coating or flame spraying. The insulating coating is then coated with a varnish to impregnate the insulation and to prevent contamination. EP 1408249 discloses a similar method, without the varnish, wherein the surface of the bearing component also includes a tool reference plane utilizable for a process of finishing the electrically insulating layer or for a thickness control of the insulating layer.

Commercially available INSOCOAT® bearings (SKF) employ a similar method to that of U.S. Pat. No. 3,924,906. The outer (non-wear) surface of the outer ring of the bearing or the inner (non-wear) surface of the inner ring of the bearing are coated with a ceramic layer which is sealed with an acrylate-based composition. The coated surface is then machined to the required dimension.

It is an object of the present invention to provide an insulated bearing which can be fitted using standard methods and tooling and maintains its electrical performance even in high humidity environments for extended periods.

Accordingly, the present invention aims to tackle at least some of the problems associated with the prior art or, at least, to provide a commercially useful alternative.

SUMMARY OF INVENTION

In a first aspect, the present invention provides a bearing component having a surface comprising a ceramic, wherein the ceramic has a plurality of pores, and where at least some of the pores are at least partially filled with a resin comprising a resole phenolic resin.

The present invention will now be further described. In the following passages different aspects of the invention are defined in more detail. Each aspect so defined may be combined with any aspect or aspects unless clearly indicated to the contrary. In particular, any feature indicated as being preferred or advantageous may be combined with any other feature or features indicated as being preferred or advantageous.

As noted above, bearings are devices that permit relative motion between two parts. Rolling element bearings typically comprise inner and outer raceways with a plurality of rolling elements disposed therebetween. Examples of rolling elements include balls, rollers and tapered rollers.

Components used within bearings will have wear and non-wear surfaces. Wear surfaces are those surfaces which contact another surface which, in use, moves relative to that surface. For example, the entire outer surface of a ball rolling element will be considered a wear surface, whereas only the inner surface of a raceway for contacting a ball rolling element constitutes a wear surface. As will be appreciated, in use, greases or oils or other working fluids will be present between the wear surfaces.

Preferably the bearing component is an inner or an outer raceway. Such components are well known in the art.

For long-term reliability it is important that the various components of a bearing have a high resistance to rolling contact fatigue, wear and creep. In order to satisfy these requirements bearing components are generally made of metals, particularly steels and, most preferably, bearing steels. These materials, which are well known in the art, readily conduct electricity and therefore bearings are susceptible to the flow of an electrical current.

Surface coatings for such bearing components are also known in the art. For example, SKF INSOCOAT® uses a surface coating which makes the bearing electrically resistant. In particular, INSOCOAT® bearings are designed to prevent electrical current from passing through the bearing. The bearings are a cost-effective solution compared with other insulation methods. By integrating the insulating properties into the bearing, INSOCOAT® bearings can improve reliability and increase machine uptime by addressing the problem of electrical erosion. In more detail, an INSOCOAT® bearing has the external surfaces of its inner or outer ring plasma-sprayed with, for example, aluminium oxide to form a coating. The coating is sealed with an acrylate composition to protect against the conductive effects of water and moisture.

The inventors have found that, while INSOCOAT® bearings may effectively eliminate current passage under normal working conditions, their performance tends to degrade after long exposure to humidity. Without wishing to be bound by theory, such coatings are often porous and may therefore be susceptible to infiltration of water in humid environments.

The inventors have now found that the problems associated with long exposure to humidity may be mitigated by the provision of a resin to impregnate the pores of a porous ceramic, typically a ceramic surface coating, wherein the resin comprises a resole phenolic resin. In particular, coatings of the present invention tackle the problems with humidity by the use of a coating wherein the pores of a ceramic are at least partially filled with the resole phenolic resin. This helps make the coating impervious to water, and therefore, maintain its electrical resistance.

The surface comprising the ceramic may be a wear surface and/or a non-wear surface. However, the surface will typically be a non-wear surface.

The bearing component may be, for example, an inner or an outer raceway.

Resole phenolic resins are phenol-formaldehyde resins having a formaldehyde to phenol ratio (molar) of greater than one. Without wishing to be bound by theory, resole phenolic resins are generally highly cross-linked giving them high hardness, good thermal stability and chemical imperviousness. The use of a resole phenolic resin is particularly useful because of these properties and also because it has been found to readily impregnate porous ceramic coatings, particularly metal oxides such as aluminium oxide. The application of the resole phenolic resin and its impregnation of the porous ceramic may advantageously be facilitated by dissolving the resole phenolic resin is one or more organic solvents.

The phenolic resin used in the present invention is a resole phenolic resin rather than a novalac phenolic resin. Novalac phenolic resins have been found to be difficult to apply to bearing component comprising a porous ceramic portion such as aluminium oxide. Moreover, the long term performance in humid environments has been found to be inferior to a resole phenolic resin.

In addition, the resole phenolic resin has been found to yield improved appearance and reduce the amount of excess resin left on the surface of the coating after an impregnation step.

The ratio (molar) of phenol to formaldehyde in the resole phenolic resin is preferably in the range of 5:1 to 3:1, more preferably about 4:1.

Preferably the surface coating is provided on a non-wear surface of the bearing component. The non-wear surface may be, for example, one or more of the outer surface of an outer bearing ring, the inner surface of an inner bearing ring, the side surfaces (i.e. the surfaces substantially perpendicular to the axis of the bearing) of an outer ring or the side surfaces of an inner ring.

Preferably the surface coating substantially covers all of the non-wear surfaces of the component. Insulating coatings such as those of the present invention are preferably continuous across the surface to be coated in order for the bearing to maintain its electrical resistance. It is therefore preferable to coat non-wear surfaces of bearing components, as coatings on wear surfaces may be abraded to such an extent that they lose their electrically resistive properties.

In the bearing component according to the present invention, the ceramic will typically be provided as a surface coating on a metal or alloy substrate, preferably a steel substrate, for example a bearing steel substrate.

Preferably the surface coating has a thickness of from 0.04 to 1 mm, preferably from 0.1 and 0.5 mm. This is preferably the mean thickness. When surface coatings are thinner than this their electrical resistance may not be as high nor as reliable. When surface coatings are thicker than this they may require additional machining steps.

The ceramic may comprise, for example, a metal oxide, preferably aluminium oxide. Such materials are conventional in the art and are inherently porous. Metal oxides may be sufficiently hardwearing, adhere well to the bulk bearing component material (eg bearing steel) and be deposited onto the surface of the component using conventional methods. Metal oxides can also show very high electrical resistivity. Aluminium oxide is advantageous because it can be readily applied by conventional spray coating to form an even thickness coating. As noted, the coating is inherently porous and is readily impregnated by the resin used in the present invention.

According to a further aspect, there is provided a bearing comprising a component as described herein. The bearing will primarily be used as an (electrically) insulted bearing.

According to a further aspect there is provided a process for making a bearing component as herein described, the process comprising:
  providing a bearing component comprising a metal or alloy substrate, preferably a steel substrate;
  forming a ceramic layer on a surface of the substrate, wherein the ceramic layer has a plurality of pores in an outer surface thereof;
  impregnating the ceramic layer with a resin comprising a resole phenolic resin, wherein at least some of the pores in the ceramic layer are at least partially filled with the resin; and
  curing the resin.

During the impregnating step, the resin enters into and at least partially fills some or all of the pores in the ceramic layer. Methods for achieving the impregnation include solvent-based impregnation, dip impregnation by a rotational method and vacuum pressure impregnation. Such methods are known in the art.

The curing step is conventional and may be achieved by, for example, the application of heat and/or light.

The resin is preferably cured by a heat curing process and is typically cured in an oven, preferably in air. The resin is preferably cured at a temperature of from 100 to 200° C. The curing time is preferably from 5 minutes to 12 hours. The curing is ideally conducted in air.

The resin viscosity may affect the degree of impregnation, the speed of the impregnation process, the surface appearance and the amount of excess resin left on the surface after the impregnation process.

Preferably the process of the above aspect is for forming the bearing as described herein.

Preferably the step of forming a layer on the at least one surface comprises: (a) plasma spraying; (b) suspension spraying; (c) high velocity oxygen fuel spraying; and/or (d) flame spraying. Such techniques are known in the art.

Preferably the process further comprises a finishing step of removing at least a portion of resin remaining on the ceramic layer, and/or removing at least a portion of the ceramic layer impregnated with the resin. Preferably the bearing component is machined by grinding, polishing or turning to the required dimension.

Preferably the resin used in the step of impregnating the layer is pre-dissolved in one or more organic solvents. The organic solvent preferably comprises ethanol and/or methanol.

Where a mixture of methanol and ethanol is used the concentration of methanol in ethanol is 1 to 99 wt. %, more preferably 3 to 7 wt. % (i.e. preferably 97 to 93 wt. % ethanol). The solution of resin preferably comprises from 10 to 90 wt. % solvent, more preferably from 25 to 75 wt. % solvent based on the total weight of the resin and solvent. Dissolving the resin in such a solvent may reduce the viscosity and, moreover, increase the shelf life of the resin, leading to improved appearance and reducing the amount of excess resin left on the surface of the coating after the impregnation step. Moreover, it is possible that the solvent also breaks down the molecular size of the sealant, thereby improving gap filling capability for small pores.

Preferably the coating is impregnated with the resin in air.

According to a further aspect, there is provided a process for forming a bearing from one of more bearing components, at least one of which is made according to the process described herein. That is, according to the process described herein, there may be a further step comprising forming a bearing comprising the bearing component.

BRIEF DESCRIPTION OF THE DRAWINGS

The present invention will now be described further, by way of example, in relation to the following non-limiting figures, in which.

DETAILED DESCRIPTION OF SOME EMBODIMENTS

Figure 1:
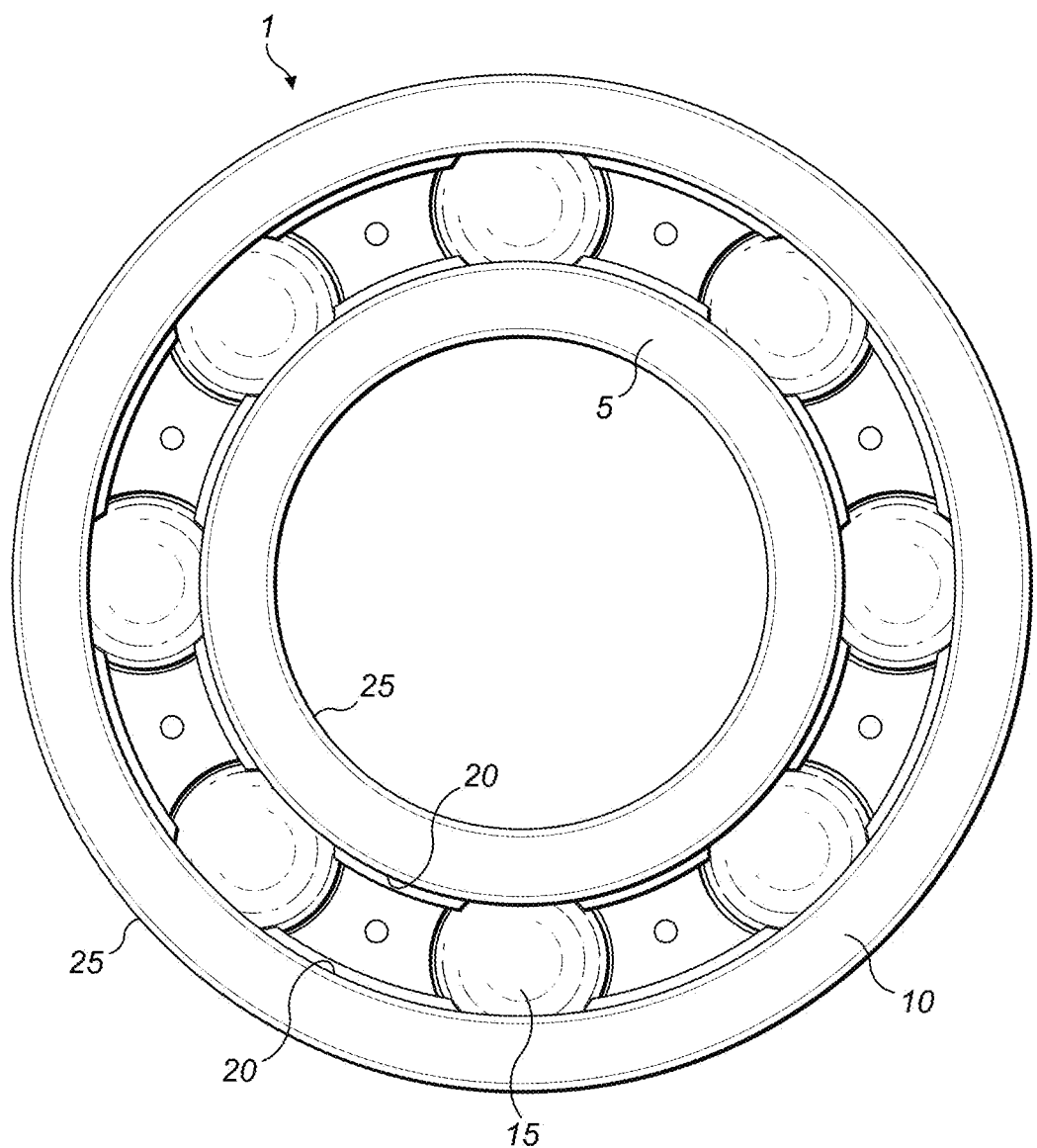
FIG. 1 shows a bearing according to the present invention.

FIG. 1 shows an example of a bearing according to the present invention. The bearing 1 comprises an inner raceway 5 having a groove (not shown), and an outer raceway 10 having a groove (not shown). A plurality of ball bearings 15 is provided between the inner raceway 5 and the outer raceway 10, such that the ball bearings 15 fit within the respective grooves.

The inner and outer raceways 5, 10 are provided with wear surfaces 20 which contact the ball bearings 15 in use, and non-wear surfaces 25, which do not. The non-wear surfaces 25 are at least in part used for connecting the bearing 1 to the device within which they are to be used.

The non-wear surfaces 25 are provided with a porous ceramic surface coating across the entire non-wear surface. This is preferably about 0.5 mm thick. The coating is impregnated with a resole phenolic resin.

Figure 2:
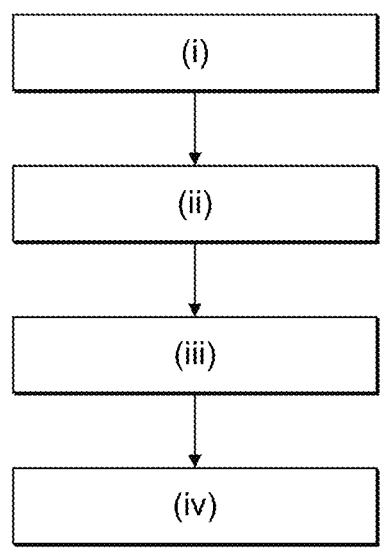
FIG. 2 shows a flowchart of a process according to the present invention.

Referring to FIG. 2, the flowchart describes a general process for making a bearing component having a surface coating according to the present invention. In particular, the process steps comprise: (i) providing a bearing component comprising a metal or alloy substrate, preferably a steel substrate; (ii) forming a ceramic layer on a surface of the substrate, wherein the ceramic layer includes a plurality of pores in an outer surface thereof; (iii) impregnating the ceramic layer with a resin comprising a resole phenolic resin, wherein at least some of the pores in the ceramic layer are at least partially filled with the resin; and (iv) curing the resin. The curing is ideally conducted in air.

The invention will now be described in relation to the following non-limiting examples.

EXAMPLE 1

A resole phenolic resin dissolved in an ethanol-methanol solvent (ethanol is the major component of the solvent) with approximately 50 wt. % mixture was impregnated into the pores of a plasma-sprayed aluminium oxide coating and then cured in an oven at approximately 150° C. for a period of approximately 30 to 60 minutes. The ratio (molar) of formaldehyde to phenol is approximately 4:1.

The electrical resistance after contact with water for two weeks was assessed and compared to prior coating techniques (INSOCOAT®). The external diameter of the tested bearing (OR 6316 VL0241) was approximately 170 mm and the width was approximately 38 mm. The applied voltage was approximately 1000 V. The coatings were ground prior to testing.

The resole phenolic resin sample was superior to the conventional INSOCOAT® sample in terms of the overall electrical resistance and the maintenance of the electrical resistance over time in a humid environment. Such a test involves assessing the electrical resistance (at 1000 V) of samples in contact with wet (water) felt over a period of seven days or even longer.

The present inventors have also compared resole phenolic resins with other possible candidates for sealing bearing components having a surface comprising a (porous) ceramic. The inventors have found that epoxies are brittle and suffer from relatively poor water resistance. Polyurethanes tend to be sensitive to moisture and have a low temperature resistance and short pot life. Modified acrylics exhibit a low, hot temperature strength and are flammable. Cyanoacrylates have poor heat resistance and limited solvent resistance. Silicones have high viscosity and thus poor gap filling. Polysulfides also exhibit relatively poor gap filling.

The use of a resole phenolic resin according to the present invention for sealing bearing components having a surface comprising a (porous) ceramic is advantageous in terms of resistance to water infiltration in humid environments. Additional benefits include good gap filling, low viscosity and ease of application, the ability to be cured in air, and limited shrinkage during curing.

Although preferred embodiments of the invention have been described herein in detail, it will be understood by those skilled in the art that variations may be made thereto without departing from the scope of the invention or of the appended claims.

The invention claimed is:

1. A bearing component having a ceramic surface: the ceramic surface including a plurality of pores, wherein at least some of the pores are at least partially filled with a resin comprising a resole phenolic resin.

2. The bearing component according to claim 1, wherein the ceramic is provided as a surface coating on a metal or alloy substrate.

3. The bearing component according to claim 2, wherein the ceramic surface is a non-wear surface.

4. The bearing component according to claim 3, wherein the bearing component is an inner or an outer raceway.

5. The bearing component according to claim 4, wherein the ceramic surface coating has a mean thickness of from 0.04 to 1 mm.

6. The bearing component according to claim 5, wherein the ceramic comprises a metal oxide.

7. The bearing component according to claim 5, wherein the ceramic comprises an aluminium oxide.

8. The bearing component according to claim 5, wherein the ceramic comprises aluminium oxide.

9. A bearing comprising: a bearing component according to claim 1.

10. The bearing according to claim 9, wherein the bearing is an insulated bearing.

11. The bearing component according to claim 4, wherein the ceramic surface coating has a mean thickness of from 0.1 and 0.5 mm.

12. The bearing component according to claim 1, wherein the ceramic is provided as a surface coating on a steel substrate.

13. A process for making a bearing component, the process comprising:
providing a bearing component comprising a metal or alloy substrate;
forming a ceramic layer on a surface of the substrate, wherein the ceramic layer includes a plurality of pores in an outer surface thereof;
impregnating the ceramic layer with a resin comprising a resole phenolic resin, wherein at least some of the pores in the ceramic layer are at least partially filled with resin; and
curing the resin.

14. The process according to claim 13, wherein the step of forming the ceramic layer on a surface of the substrate comprises one or more of:
(a) plasma spraying;
(b) suspension spraying;
(c) high velocity oxygen fuel spraying; and/or
(d) flame spraying.

15. The process according to claim 14, wherein the ceramic layer is formed with a mean thickness of from 0.04 to 1 mm.

16. The process according to claim 15, further comprising a finishing step of at least one of removing at least a portion of resin remaining on the ceramic layer and removing at least a portion of the ceramic layer impregnated with the resin.

17. The process for making a bearing component according to claim 16, wherein the resin used in the step of impregnating the ceramic layer is pre-dissolved in one or more organic solvents.

18. The process according to claim 14, wherein the ceramic layer is formed with a mean thickness of from 0.1 and 0.5 mm.

19. The process according to claim 13, wherein the metal or alloy substrate is a steel substrate.

* * * * *